| United States Patent [19] | [11] Patent Number: 4,694,064 |
| --- | --- |
| Tomalia et al. | [45] Date of Patent: Sep. 15, 1987 |

[54] ROD-SHAPED DENDRIMER

[75] Inventors: Donald A. Tomalia; Pamela M. Kirchhoff, both of Midland, Mich.

[73] Assignee: The Dow Chemical Company, Midland, Mich.

[21] Appl. No.: 834,993

[22] Filed: Feb. 28, 1986

[51] Int. Cl.$^4$ .............................................. C08G 69/10
[52] U.S. Cl. .................................... 528/332; 525/410; 525/419; 528/271; 528/310; 528/350; 528/363; 528/373
[58] Field of Search ............... 528/332, 363, 310, 350, 528/373, 271; 525/410, 419

[56] References Cited

U.S. PATENT DOCUMENTS 4,558,120 12/1985 Tomalia et al. ..................... 528/332
4,568,737 2/1986 Tomalia et al. ..................... 528/332

Primary Examiner—Harold D. Anderson

[57] ABSTRACT

Rod-shaped dendrimers having a plurality of dendritic branches emanating from an essentially linear core are prepared by first reacting a linear polyfunctional core compound such as a polyethyleneimine with a first dendritic branching reactant such as an ester of an unsaturated carboxylic acid, e.g., methyl acrylate, and then successively reacting the resulting product with a second dendritic branching reactant such as ethylenediamine and then with the first or another dendritic branching reactant.

The rod-shaped dendrimers are useful in the production of molecular composites and as crystallinity modifiers for polymeric materials.

13 Claims, No Drawings

ROD-SHAPED DENDRIMER

BACKGROUND OF THE INVENTION

This invention relates to branched polymers containing dendritic branches having functional groups uniformly distributed on the periphery of such branches. This invention also relates to processes for preparing such polymers as well as applications therefore.

Organic polymers are generally classified in a structural sense as either linear or branched. In the case of linear polymers, the repeating units (often called mers) are divalent and are connected one to another in a linear sequence. In the case of branched polymers, at least some of the mers possess a valency greater than 2 such that the mers are connected in a nonlinear sequence.

The term "branching" usually implies that the individual molecular units of the branches are discrete from the polymer backbone, yet have the same chemical constitution as the polymer backbone. Thus, regularly repeating side groups which are inherent in the monomer structure and/or are of different chemical constitution than the polymer backbone are not considered as branches, e.g., dependent methyl groups of linear polypropylene. To produce a branched polymer, it is necessary to employ an initiator, a monomer, or both that possess at least three moieties that function in the polymerization reaction. Such monomer or initiators are often called polyfunctional.

The simplest branched polymers are the chain-branched polymers wherein a linear backbone bears one or more essentially linear pendant groups. This simple form of branching, often called comb branching, may be regular wherein the branches are uniformly and regularly distributed on the polymer backbone or irregular wherein the branches are distributed in nonuniform or random fashion on the polymer backbone. See T. A. Orofino, *Polymer*, 2, 295–314 (1961). An example of regular comb branching is a comb-branched polystyrene as described by T. Altores et al. in *J. Polymer Sci., Part A*, 3, 4131–4151 (1965) and an example of irregular comb branching is illustrated by graft copolymers as described by Sorenson et al. in "Preparative Methods of Polymer Chemistry", 2nd Ed., Interscience Publishers, 213–214 (1968).

Another type of branching is exemplified by cross-linked or network polymers wherein the polymer chains are connected via tetravalent compounds, e.g., polystyrene molecules bridged or cross-linked with divinylbenzene. In this type of branching, many of the individual branches are not linear in that each branch may itself contain groups pendant from a linear chain. More importantly in network branching, each polymer macromolecule (backbone) is cross-linked at two or more sites to two other polymer macromolecules. Also the chemical constitution of the cross-linkages may vary from that of the polymer macromolecules. In this so-called cross-linked or network-branched polymer, the various branches or cross-linkages may be structurally similar (called regular cross-linked) or they may be structurally dissimilar (called irregularly cross-linked). An example of regular cross-linked polymers is a ladder-type poly(phenylsilsesquinone) as described by Sorenson et al., supra, at page 390. The foregoing and other types of branched polymers are described by H. G. Elias in *Macromolecules*, Vol. I, Plenum Press, New York (1977).

There have also been developed polymers having so-called star structured branching wherein the individual branches radiate out from a nucleus and there are at least 3 branches per nucleus. Such star-branched polymers are illustrated by the polyquaternary compositions described in U.S. Pat. Nos. 4,036,808 and 4,102,827. Star-branched polymers prepared from olefins and unsaturated acids are described in U.S. Pat. No. 4,141,847. The star-branched polymers offer several advantages over polymers having other types of branching. For example, it is found that the star-branched polymers may exhibit higher concentrations of functional groups thus making them more active for their intended purpose. In addition, such star-branched polymers are often less sensitive to degradation by shearing which is a very useful property in formulations such as paints, in enhanced oil recovery and other viscosity applications. Additionally, the star-branched polymers have relatively low intrinsic viscosities even at high molecular weight.

Recently, in order to provide polymers which exhibit even greater concentrations of functional groups per unit volume of the polymer macromolecule as well as a more uniform distribution of such functional groups in the exterior regions of the macromolecule than exhibited by conventional star polymers, dendritic polymers were developed. See, for example, U.S. Pat. No. 4,507,466. While such dendritic polymers (often called dendrimers) are more compact than conventional star polymers, they are generally spheroidal in shape. For many applications, such as production of molecular composites, generally rod-like or cylindrically-shaped polymers are desirable.

SUMMARY OF THE INVENTION

In one aspect, this invention is a cylindrically-shaped dendrimer having a plurality of dendritic branches (hereinafter called a core branch) emanating from an essentially linear core, each of said core branches having at least 2 terminal groups provided that (1) the ratio of terminal groups to the core branches is more than one, preferably two or greater, (2) the density of terminal groups per unit volume in the polymer is at least 1.5 times that of an extended conventional comb-branched polymer having similar linear core and monomeric moieties and a comparable molecular weight and number of core branches, each of such branches of the extended conventional comb-branched polymer bearing only one terminal group, and (3) a molecular volume that is no more than about 80 percent of the molecular volume of said extended conventional comb-branched polymer as determined by dimensional studies using scaled Corey-Pauling molecular models.

The extended conventional comb-branched polymer which is used as the base for comparison with the cylindrical dendrimer is one that has the same molecular weight, same linear core and monomeric components and same number of core branches as the cylindrical dendrimer. By "extended" it is meant that the individual branches of the conventional comb-branched polymer are extended or stretched to their maximum length, e.g., as such branches exist when the comb-branched polymer is completely solvated in an ideal solvent for the comb-branched polymer. In addition, while the number of terminal groups is greater for the dendrimer molecule than in the conventional comb-branched polymer molecule, the chemical structure of the terminal groups is the same.

For the purposes of this invention, a "cylindrical dendrimer" is a polymer having a linear polyvalent core that is covalently bonded to at least 8 dendritic (treelike) branches which extend through at least two generations to give an aspect ratio greater than 2. The aspect ratio is the ratio of the average length of the cylindrical dendrimer molecules to the average diameter thereof. As an illustration, an ordered second generation dendritic branch is depicted by the following configuration:

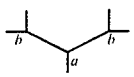

wherein "a" represents the first generation and "b" represents the second generation. An ordered, third generation dendritic branch is depicted by the following configuration:

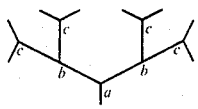

wherein "a" and "b" represent the first and second generation, respectively, and "c" represents the third generation. A primary characteristic of the ordered dendritic branch which distinguishes it from conventional branches of conventional polymers is the uniform or essentially symmetrical character of the branches as is shown in the foregoing illustrations. In addition, with each new generation, the number of terminal groups on the ordered dendritic branch is an exact multiple of the number of terminal groups in the previous generation. While less preferred, non-ordered dendritic branches, which are suitable for the purposes of invention, have a generally tree-like structure, but may not contain the exact multiple of the number of terminal groups in the previous generation.

The term "linear core" means a polyvalent moiety derived from a generally linear molecule such as a linear polymer having an aspect ratio, i.e., average molecular length to average molecular diameter, of at least 10:1. The number of valences per linear core corresponds to the number of core branches covalently bonded to the linear core.

Other aspects of this invention are methods for using the cylindrical dendrimers in the production of molecular composites and as crystallinity modifiers for polymeric materials, microdimensional antennae as such are described in U.S. Pat. No. 4,445,050 and templates or channels for membranes.

The linear dendrimers of the present invention exhibit the following properties which are unique or are superior to similar properties of conventional extended comb-branched polymers and other branched polymers having similar molecular weight and terminal groups:
(a) greater branch density;
(b) greater terminal group density;
(c) greater accessibility of terminal groups to chemically reactive species; and
(d) lower viscosity.

DETAILED DESCRIPTION OF ILLUSTRATIVE EMBODIMENTS

In the cylindrical dendrimers of the present invention, the linear core is covalently bonded to at least 8, preferably at least 10, most preferably at least 15, core branches with each core branch having a calculated length of at least 3 Angstrom units (Å), preferably at least 4 Å, most preferably at least 6 Å. These dendrimers have an average of at least 2, preferably at least 3 and most preferably at least 4 terminal groups per dendritic branch. The core branches have a dendritic character, preferably an ordered dendritic character as defined herein.

The cylindrical dendrimers of this invention preferably have (1) cross-sectional molecular diameters in the range from about 5 to about 1000 Angstrom units (Å), more preferably from about 10 Å to about 250 Å and most preferably from about 15 Å to about 125 Å and (2) cylindrical lengths in the range from about 50 to about 20,000 Å, more preferably from about 100 to about 15,000 Å and most preferably from about 200 to about 10,000 Å. The length and diameter are determined by the following electron microscopic method. First, the terminal groups of dendrimers are connected to anionic moieties (e.g., by hydrolysis of the terminal ester moieties of polyamidoamine dendrimer in half generation state). The anionic dendrimer molecules are then neutralized with stoichiometric amounts of alkali metal hydroxide. A dilute aqueous solution (e.g., about 0.05 weight percent of the neutralized dendrimer in water) of the dendrimer is placed on a beryllium grid ($\sim 1.5$ millimeter diameter puddle) and allowed to evaporate. The dendrimer often exhibits dendritic-like crystalline growth during the evaporation process. The diameter of the dry dendrimer molecules in two-dimensional state are then measured by electron microscopy and found to correspond closely, e.g., within 15 percent, to the diameters predicted by scaled Corey-Pauling molecular models. Such measurements are readily made using a *JEM*-1200 *EX Electron Microscope* sold by JEOL Corporation using CTEM techniques on a beryllium grid coated with 50 Å carbon.

In preferred dendrimers, the terminal groups are functional groups that are sufficiently reactive to undergo addition or substitution reactions. Examples of such functional groups include amino, hydroxyl, mercapto, carboxyl, alkenyl, allyl, vinyl, amido, halo, urea, oxiranyl, aziridinyl, oxazolinyl, imidazolinyl, sulfonato, phosphonato, isocyanato and isothiocyanato. The dendrimers differ from conventional comb-branched polymers in that the dendrimers have a greater concentration of terminal groups per unit of molecular volume than do conventional extended comb-branched polymers having an equivalent number of core branches and an equivalent core branch length. Thus, the density of terminal groups per unit volume in the dendrimers is at least about 1.5 times the density of terminal groups in the conventional extended comb-branched polymer. The ratio of terminal groups per core branch in the dendrimer is at least 2. Preferably, for a given polymer molecular weight, the molecular volume of the dendrimer is less than 70 volume percent, more preferably from about 16 to about 60, most preferably from about 7 to about 50 volume percent of the molecular volume of the conventional extended comb-branched polymer.

In the preferred polyether dendrimers, the density of terminal functional moieties, usually hydroxy, in the dendrimer is readily expressed as the molar ratio of terminal functional moieties to the total ether moieties. In such dendrimers, this molar ratio of terminal groups to ether groups is preferably from about 3:1 to about 1.003:1, more preferably from about 3:1 to about 1.5:1, most preferably from about 2.5:1 to about 2:1.

The cylindrical dendrimers of the present invention are characterized as having a linear polyvalent core that is covalently bonded to at least 10 ordered dendritic branches which extend through at least 2 generations. Such ordered branching can be illustrated by the following sequence wherein G indicates the number of generations:

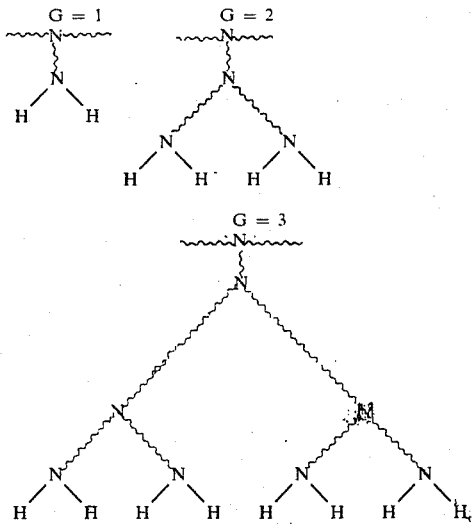

Mathematically, the relationship between the number of terminal groups on a dendritic branch and the number of generations of the branch can be represented as follows:

$$\# \text{ of terminal groups per dendritic branch} = \frac{N_r^G}{2}$$

wherein G is the number of generations and $N_r$ is the repeating unit multiplicity which is at least 2 as in the case of amines. The total number of terminal groups in the dendrimer is determined by the following:

$$\# \text{ of terminal groups per dendrimer} = \frac{N_c N_r^G}{2}$$

wherein G and $N_r$ are as defined before and $N_c$ represents the valency (often called core functionality) of the linear core compound. Accordingly, the dendrimers of the present invention can be represented in its component parts as follows:

$$(\text{Core})\left[(\text{Repeat Unit})\frac{N_r^G - 1}{N_r - 1}\left(\begin{array}{c}\text{Terminal}\\ \text{Moiety}\end{array}\right)\frac{N_r^G}{2}\right]_{N_c}$$

wherein the Core, Terminal Moiety, G and $N_c$ are as defined before and the Repeat Unit has a valency or functionality of $N_r + 1$ wherein $N_r$ is as defined before.

A cylindrical copolymer dendrimer which is preferred for the purposes of this invention is a unique compound constructed of polyfunctional monomer units in a highly branched (dendritic) array. The dendrimer molecule is prepared from a linear polyfunctional initiator unit (core compound), polyfunctional repeating units and terminal units which may be the same or different from the repeating units. The linear core compound is represented by the formula I $(Z^c)_{Nc}$, wherein I represents the polyfunctional linear core, Z represents the functional groups bonded to I and Nc represents the core functionality which is preferably 8 or more, most preferably 10 or more. Thus, the cylindrical dendrimer molecule comprises a polyfunctional core, I, bonded to a number (Nc) of functional groups, $Z^c$, each of which is connected to the monofunctional tail of a repeating unit, $X^1Y^1(Z^1)_{N}1$, of the first generation and each of the Z groups of the repeating unit of one generation is bonded to a monofunctional tail of a repeating unit of the next generation until the terminal generation is reached. In the dendrimer molecule, the repeating units are the same within a single generation, but may differ from generation to generation. In the repeating unit, $X^1Y^1(Z^1)_{N}1$, $X^1$ represents the monofunctional tail of the first generation repeating unit, $Y^1$ represents the moiety constituting the first generation, $Z^1$ represents the functional group of the polyfunctional head of the repeating unit of the first generation and may be the same as or different from the functional groups of the core compound, I $(Z)_{Nc}$, or other generations; and $N^1$ is a number of 2 or more, most preferably 2, 3 or 4, which represents the multiplicity of the polyfunctional head of the repeating unit in the first generation. Generically, the repeating unit is represented by the formula $X^iY^i(Z^i)_{N}i$ wherein "i" represents the particular generation from the first to the t-1 generation. Thus, in the preferred dendrimer molecule, each $Z^1$ of the first generation repeating unit is connected to an $X^2$ of a repeating unit of the second generation and so on through the generations such that each $Z^i$ group for a repeating unit $X^iY^i(Z^i)_{N}i$ in generation number "i" is connected to the tail ($X^{i+1}$) of the repeating unit of the generation number "i+1". The final or terminal of a preferred dendrimer molecule comprises terminal units, $X^tY^t(Z^t)_{N}t$ represents terminal generation and $X^t$, $Y^t$, $Z^t$ and $N^t$ may be the same as or different from $X^i$, $Y^i$, $Z^i$ and $N^i$ except that there is no succeeding generation connected to the $Z^t$ groups and $N^t$ may be less than two, e.g., zero or one. Therefore the preferred dendrimer has a molecular formula represented by $$( I \ (Z^c)_{Nc})\left[(X^iY^i(Z^i)_{N^i})_{Nc} \mathop{\pi}_{n=1}^{i-1} N^n\right](X^tY^t(Z^t)_{N^t})_{Nc\pi N^n}.$$

for where $a$ is one to $t - 1$ wherein the symbols are as previously defined. The $\pi$ function is the product of all the values between its defined limits. Thus $$\mathop{\pi}_{n=1}^{i-1} N^n = (N^1)(N^2)(N^3)(N^{i-2})(N^{i-1})$$

which is the number of repeat units, $X^iY^i(Z^i)_{N}i$, comprising the ith generation of one dendritic branch. In cylindrical copolymer dendrimers, the repeat unit for one generation differs from the repeat unit in at least one other generation.

The preferred dendrimers are very symmetrical as illustrated in structural formulas described hereinafter. Preferred dendrimers may be converted to functionalized dendrimers by contact with another reagent. For example, conversion of hydroxyl in the terminal generation to ester by reaction with an acid chloride gives an ester terminally functionalized dendrimer. This functionalization need not be carried out to the theoretical maximum as defined by the number of available functional groups and, thus, a functionalized dendrimer may not have high symmetry or a precisely defined molecular formula as is the case with the present dendrimer.

An illustration of a functionally active dendrimer of a linear core which has eleven ordered, second generation dendritic branches is depicted by the following configuration:

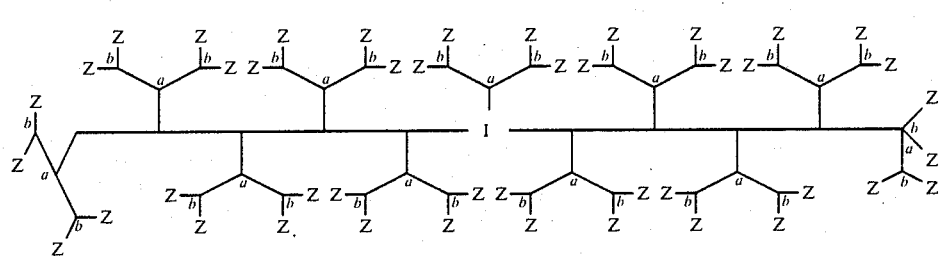

wherein I is a linear core molecule having a covalent bond with each of the eleven dendritic branches, Z is a terminal moiety and "a" and "b" are as defined hereinbefore. An example of such a cylindrical dendrimer is polyamidoamine represented by the following structural formula:

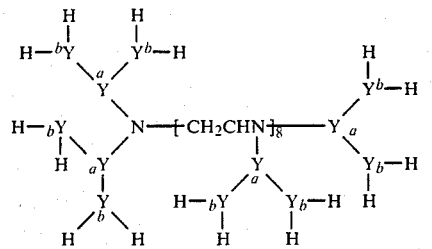

wherein Y represents a trivalent moiety such as an amidoamine moiety, e.g.,

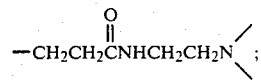

a polyamine moiety, e.g.,

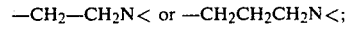

or other moiety, e.g.,

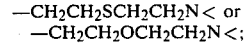

and "a" and "b" indicate first and second generations, respectively. In this illustration, $N_c$ is 11, $N_r$ is 2 and the repeat unit is Y. While the foregoing configuration and formula illustrate a linear core having eleven valences, the core molecule may be any polyvalent or polyfunctional moiety having a suitable aspect ratio, preferably a polyvalent or polyfunctional moiety having from 8 to about 2300 valence bonds or functional sites available for bonding with the dendritic branches, most preferably from about 10 to about 10,000 valence bonds or functional sites. Accordingly, this dendrimer must have at least 2 generations in order to exhibit the desired density of terminal groups. Also, Y may be any other trivalent or tetravalent organic moiety such as

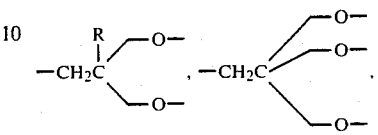

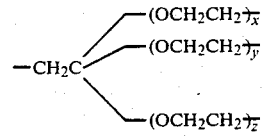

and the like, with the

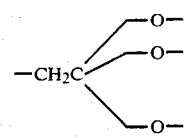

moiety being the most preferred. It is further understood that Y may be a polyvalent moiety such as triyls, tetrayls and other poly-yls of aliphatic and aromatic hydrocarbons, e.g.,

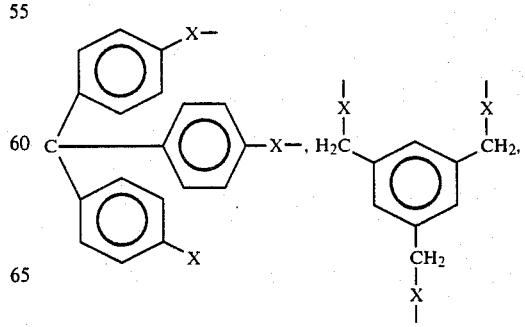

-continued

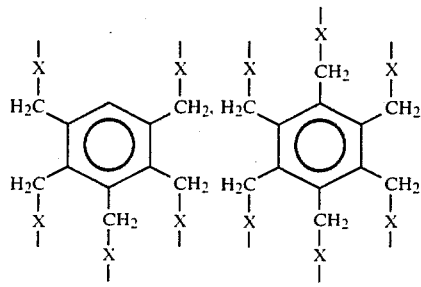

wherein X is O, S or NH.

In addition to hydroxy, the terminal groups of the dendrimer may be any functionally active moiety that can be used to propagate the dendritic branch to the next generation. Examples of such other moieties include alkoxycarbonyl, amino, alkenyl, aziridinyl, oxazolinyl, haloalkyl, halomethylphenylene, oxiranyl, isothiocyanato and isocyanato, with hydroxy or amine moieties being preferred. While the dendrimers preferably have dendritic branches advancing from 2 to 6 generations, dendrimers having dendritic branches up to 12 generations are suitably made and employed in the practice of this invention.

More preferably, the polyether dendrimers of this invention are represented by the formula:

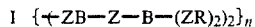

wherein I is an n-valent linear core derived from a nucleophilic compound, B is a trivalent moiety capable of linking oxy moieties, n is an integer of 10 or more corresponding to the number of the core branches, Z is oxygen or sulfur and R is hydrogen, alkyl, aryl, alkylaryl, hydroxyalkyl, mercapto alkyl, amine alkyl, acyl and the like wherein each generation is represented by ZB. Also, B may be tetravalent, e.g., —B(ZR)$_3$. More preferably B is a polyvalent radical such as

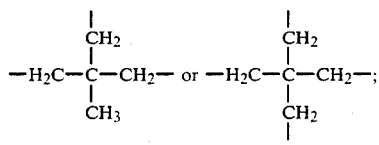

R is hydrogen, methyl, benzyl or aryl; B is alkylene, alkyleneoxyalkylene, polyalkyleneoxyalkylene, arylene, or alkyleneoxyarylene, most preferably an alkylene such as ethylene or propylene; and n is an integer from 10 to 10,000, more preferably from 20 to 5,000, most preferably from 50 to 2,000.

The cylindrical dendrimers of this invention are readily prepared by reacting a compound capable of generating a polyvalent core with a compound or compounds which causes propagation of dendritic branches from the core. In one method of preparing these dendrimers (herein called the successive excess reactant method), it is essential to maintain an excess of coreactant to reactive moieties in the terminal groups in the core, core adduct or subsequent adducts and dendrimers in order to prevent cross-linking and to maintain the ordered character of the dendritic branches. In general, this excess of coreactant to reactive moieties in the terminal groups is from about 2:1 to about 1000:1, preferably from about 3:1 to about 120:1 on a molar basis.

Alternatively, the compound capable of generating a polyvalent core, $W(X)_n$, wherein W is the polyvalent core atom and is covalently bonded to nX reactive terminal groups ($m \geq 8$), is reacted with a partially protected multifunctional reagent, TU V $_m$, wherein U represents a multivalent moiety covalently bonded to m V protected moieties ($m \geq 2$), and to one T, a moiety capable of reacting with X to form $W[(X'-T'U V_m]_n$, wherein X' and T' represent the residue of reaction between X and T. This first generation compound is then subjected to activation conditions whereby the V moieties are made reactive (deprotected) and reacted with the partially protected multifunctional reagent, T-U- V $_m$, to form the second generation protected dendrimer, $W[(X'-T'UV_mT'-U _m]_n$. This protected dendrimer can be activated and reacted again in a similar manner to provide the third generation protected dendrimer. Both the successive excess reactant and the partially protected reactant method are specifically illustrated hereinafter.

The successive excess reactant method of preparing the dendrimers is illustrated by the preparation of a dendritic polyamidoamine. In this method, polyethyleneimine, a nucleophilic linear core compound, is first reacted with methyl acrylate under conditions sufficient to cause the Michael addition of one molecule of the polyethyleneimine to three molecules of the methyl acrylate to form the following core adduct:

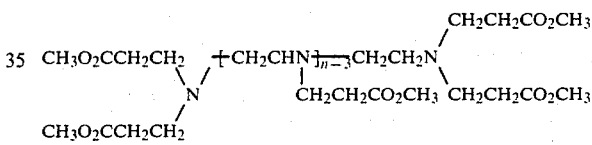

Following removal of unreacted methyl acrylate, this compound is then reacted with excess ethylenediamine under conditions such that one amine group of the ethylenediamine molecule reacts with each of the methyl carboxylate groups of the core adduct to form a first generation adduct having a number of amido-amine moieties represented by the formula:

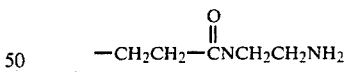

corresponding to n+4. The molar excess of ethylene diamine to methyl acrylate moieties is preferably from 4:1 to 50:1. Following removal of unreacted ethylenediamine, this first generation adduct is then reacted with excess methyl acrylate under Michael's addition conditions to form a second generation adduct having 2(n+4) terminal methyl ester moieties:

which is then reacted with excess ethylenediamine under amide-forming conditions to produce the desired polyamidoamine dendrimer having ordered, second generation dendritic branches with terminal amine moieties. The molar excess of coreactant to reactive moieties in each case is preferably from 1.1:1 to about 400:1, most preferably from about 10:1 to about 200:1.

Other dendrimers made by the successive excess reactant method are polysulfides made by (1) reacting a multifunctional mercaptan (e.g., as described by D. D. MacNicol et al. in *Tetrahedron Letter*, 23, 4131 (1982) or a linear polythiol (e.g., as described by C. G. Overberger et al. in *J. Org. Chem.*, 27, 4331 (1962) and by M. M. Brubaker in U.S. Pat. Nos. 2,378,535 and 2,378,536) under basic conditions with epichlorosulfide (prepared by method of I. Tabushi et al., *Z. Bull. Chem. Soc. Japan*, 47, 1435 (1974)) to form the first generation polyepisulfide,

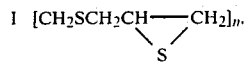

and (2) then reacting this polyepisulfide with hydrogen sulfide to form the first generation polysulfide which can be further reacted with epichlorosulfide and hydrogen sulfide to form subsequent generations. The conditions and procedures which may be suitably employed for polysulfide formation are generally described in Weissberger, *Heterocyclic Compounds with Three- and Four-Membered Rings*, Interscience Publishers, N.Y., 605 (1964) and Meade et al., *J. Chem. Soc.*, 1894 (1948). Polyaminosulfide dendrimers can be prepared by reacting a linear polyamine having a plurality of primary amine groups with an excess of ethylene sulfide to form a polysulfide and then with excess aziridine to form a first generation polyaminosulfide which can be reacted with excess ethylene sulfide and then with excess aziridine to form further generations using general reaction conditions described in U.S. Pat. No. 2,105,845 and Nathan et al., *J. Am. Chem. Soc.*, 63, 2361 (1941). The polyether or polysulfide dendrimers can also be prepared by the excess reactant method by reacting a polyhalide such as polyvinylchloride or polyvinylbromide with phenol or thiophenol to form a first generation polyarylether or polyarylsulfide and then with excess halogen to form the first generation polyhaloarylpolysulfide and then with further phenol or thiophenol to form further generations according to the procedures and conditions as described by D. D. MacNicol et al., *Tetrahedron Letters*, 23, 4131-4 (1982).

The cylindrical polyether dendrimers are preferably prepared by the partially protected reactant method wherein a first organic coreactant,

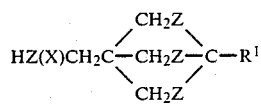

wherein X is a divalent organic radical such as alkylene, arylene, polyalkyleneoxy or polyalkylenethio, Z is oxygen or sulfur, and R¹ is hydrogen or alkyl, is first contacted with alkali metal, M°, to form a nucleophilic salt,

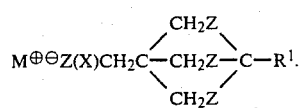

This salt is then reacted with a linear electrophilic core, I (E)$_n$ wherein I represents an n-valent linear core such as polyethylene, polyphenylene or polyether; E represents an electrophilic moiety such as tosylate, mesylate, triflate, halo, sulfate, phosphate, oxiranyl (epoxy), aziridinyl, thioepoxy, oxazolinimum cation or oxazinium cation; and n is a number from 1 to 1000, preferably 3 to 100, to form a protected first generation adduct,

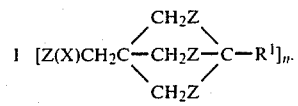

This adduct is then demasked, usually by addition of acid, to form the unprotected first generation adduct,

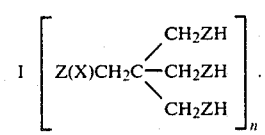

This first generation adduct is contacted with alkali metal to form

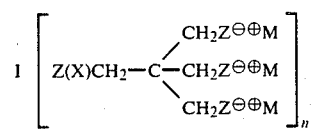

which is then reacted with

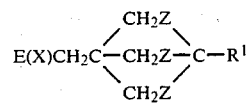

to form the second generation adduct,

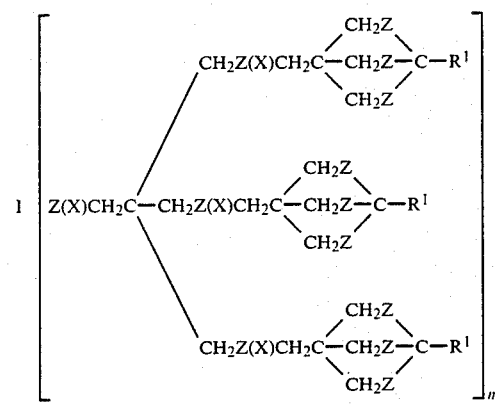

which is then demasked to form the second generation adduct. These generation building steps: metallization, electrophilic reaction and demasking can be repeated to form a third and higher generations until steric hindrance (dense packing) prevents further reaction. It is understood that X groups in one generation are the same, but may differ from X groups in other generations. The same is true for Z groups. Moreover, the foregoing reaction sequence depicts all generation building steps with multiplicity of three,

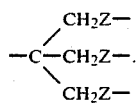

Such multiplicity may be changed from one generation to another. Also, it is understood that the partially protected method may be practiced by reacting a linear nucleophilic core, I (Z⊖⊕M)n such as polyvinyl alcohol/mercaptans or polyallyl alcohol/mercaptans, with an electrophilic functionalized organic coreactant,

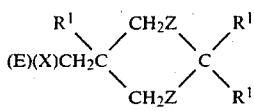

to make the masked first generation adduct.

In an illustrative embodiment of the partially protected reactant method using a linear nucleophilic core compound, a linear polyol such as polyvinyl alcohol is employed as the polyvalent core generating compound and is converted to alkali metal salt form, e.g., sodium or lithium, by reaction with alkali metal hydroxide or zero valent alkali metal and then reacted with a molar excess of a partially protected compound such as tosylate ester of 1-ethyl-4-hydroxymethyl-2,6,7-trioxabicyclo[2,2,2]octane to form a protected first generation polyether,

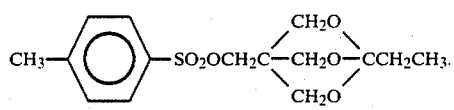

This protected polyether is then activated by reacting with acid such as hydrochloric acid to form the unprotected first generation polyether, I (O-CH$_2$C[CH$_2$OH]$_3$)$_n$. This polyether is converted to alkali metal salt form by reaction with alkali metal hydroxide or zero valence alkali metal and then reacted with a molar excess of the partially protected tosylate ether to form the protected second generation polyether. The foregoing sequence is repeated as desired for additional generation development according to conditions and procedures described in Endo et al., *J. Polym. Sci., Polym. Lett. Ed.*, 18, 457 (1980), Yokoyama et al., *Macromolecules*, 15, 11–17 (1982), and Padias et al., *Macromolecules*, 15, 217–223 (1982). These cylindrical polyether dendrimers are particularly desirable for use in highly alkaline or highly acidic media wherein hydrolysis of a polyamidoamine dendrimer would be unacceptable.

As an example of other dendrimers that are suitably prepared by the partially protected reactant method, cylindrical polyamine dendrimers may be prepared by reacting a linear polyamine having a plurality of primary or secondary amine groups with N-substituted aziridine such as N-tosyl aziridine,

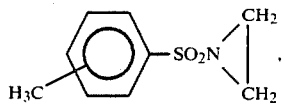

or N-mesyl aziridine,

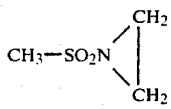

to form a protected first generation polysulfonamide and then activated with acid such as hydrochloric or sulfuric acid to form the first generation polyamine salt and reacted with further N-tosyl aziridine or N-mesyl aziridine to form the protected second generation polysulfonamide which sequence can be repeated to produce higher generation polyamines using the general reaction conditions described in Humrichause, C. P., PhD, Thesis from University of Pennsylvania, "N-Substituted Aziridines as Alkylating Agents", Ref. No. 66–10, 624 (1966).

In either of the foregoing methods of cylindrical dendrimer preparation, examples of other suitable nucleophilic core compounds include amino derivatives of polyvinylbenzyl chloride, poly(vinylamines), poly(allylamines), linear polyethyleneimines, and linear poly(trimethylenimines). Other suitable nucleophilic cores include linear polyols such as polyvinyl alcohols, polyallyl alcohols, N-hydroxyalkylated polyethyleneimines, hydroxyalkylated polyethers; polyalkylene polymercaptans; N-mercaptoalkylated polyethylenimines; and mercaptoalkylated polyethers. Of the core compounds, the polyalkylene polyamines are preferred for the preparation of polyamidoamine dendrimers by the successive excess reactant method and the linear polyols are preferred for the preparation of polyether dendrimers by the partially protected reactant method.

Examples of coreactant materials used to react with the linear nucleophilic core compounds include α, β-ethylenically unsaturated carboxylic esters and amides such as methyl acrylate, ethyl acrylate, acrylonitrile, methyl itaconate, dimethyl fumarates, maleic anhydride, acrylamide, as well as esters, acids and nitriles containing an acrylyl moiety, with methyl acrylate being the preferred coreactant material. In general other preferred unsaturated reactants are volatile or otherwise readily removed from the core/coreactant reaction products without deleteriously affecting the reaction product.

Examples of the second coreactant materials used to react with the adduct of the nucleophilic core and the first coreactant include various polyamines such as alkylene polyamines and polyalkylene polyamines such as ethylenediamine and diethylenetriamine; benzylic polyamines such as tris(1,3,5-aminomethyl)benzene; alkanolamines such as ethanolamine; and aziridine and derivatives thereof such as N-aminoethyl aziridine. Of these second coreactant materials, the volatile polyamines such as ethylenediamine and diethylenetriamine are preferred, with ethylenediamine being especially preferred.

Alternatively, the cylindrical dendrimers can be prepared by reacting an electrophilic core such as a linear polyester with a coreactant such as a polyamine to form a core adduct which is then reacted with a suitable second coreactant such as an unsaturated ester to form the first generation polyamidoamine. Thereafter, this first generation product is reacted with a suitable third coreactant such as polyamine and then with the second coreactant such as unsaturated ester to form the desired second generation dendrimer. Examples of suitable electrophilic cores include polyacrylates, polymethacylates, polyglycidyl acrylates, polyglycidyl methacrylates and polyvinylbenzoic esters. Other suitable electrophilic core compounds include linear polyhalohydrocarbons such as poly(allyl halides), polyepichlorohydrins, and poly(3,3-bishalomethyl oxetane); polyhaloalkylarenes, such as poly(vinylbenzyl halides). Preferred linear electrophilic cores include poly(methyl acrylates), poly(acryloyl chloride), poly(methacryloyl chloride), alkyl acrylate/alkyl methacrylate copolymers, polymers of alkyl fumarates, and polymers of alkyl itaconates. Of the electrophilic cores, alkyl acrylate/alkyl methacrylate copolymers and alkyl acrylate/alkyl itaconate copolymers are most preferred.

Suitable first coreactants for reaction with the electrophilic core include polyalkylene polyamines such as ethylenediamine, diethylenetriamine, triethylenetetramine and other polyamines represented by the formula:

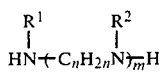

wherein $R^1$ and $R^2$ independently represent hydrogen or an alkyl, preferably $C_1$-$C_4$ alkyl, hydroxyalkyl, cyanoalkyl, or amido; n is at least 2 and preferably 2 to 6 and m is 2 to 100, preferably 2 to 5. Examples of suitable second coreactants to be used in preparing cylindrical dendrimers from electrophilic cores include alkyl esters of ethylenically unsaturated carboxylic acids such as methyl acrylate, methyl methacrylate, ethyl acrylate and the like. Examples of suitable third coreactants are those illustrated for the first coreactant.

Thus prepared, the cylindrical dendrimers can be reacted with a wide variety of compounds to produce the polyfunctional compounds having the unique characteristics that are attributable to the structure of the dendrimer. For example, a dendrimer having terminal amine moieties may be reacted with an unsaturated nitrile to yield a polynitrile (nitrile-terminated) dendrimer. Alternatively, a polyamine dendrimer may be reacted with (1) an $\alpha$, $\beta$-ethylenically unsaturated amide to form a polyamide (amide-terminated) dendrimer, (2) an $\alpha$, $\beta$-ethylenically unsaturated ester to form a polyester (ester-terminated) dendrimer, (3) an oxirane to yield a polyol (hydroxy-terminated) dendrimer, or (4) a cyclic sulfide to yield a polymercapto (thiol-terminated) dendrimer. An ester-terminated cylindrical dendrimer can be reacted with a basic hydroxide such as alkali metal hydroxide, alkaline earth metal hydroxide to form a metal-carboxylic acid salt-terminated dendrimer. The polyether dendrimer having terminal hydroxyl moieties may be reacted with carboxylic acids to an ester terminated dendrimer, with alcohol or alkyl halide to form an ether terminated dendrimer, with isocyanate to form a urethane terminated dendrimer, with thionyl chloride to form chloride terminated dendrimer, and with tosylate to form a tosyl terminated dendrimer.

In addition, the cylindrical dendrimer may be reacted with an appropriate difunctional or trifunctional compound such as an organo polyhalide, e.g., 1,4-dichlorobutane polyesters such as poly(methyl acrylate); polyethers such as polyepichlorohydrin or polyisocyanate or polyisothiocyanate such as toluene diisocyanate, methylene diphenylene diisocyanate and polymers thereof (so-called MDI and polymeric MDI) and other aromatic polyisocyanates, aliphatic polyisocyanates and corresponding polyisothiocyanates, to form a poly(dendrimer) or bridged dendrimer having a plurality of cylindrical dendrimers linked together through the residues of the polyhalide, polyester, polyether, or polyisocyanate. Dendrimer bridging also results when hydroxyl-terminated dendrimer is mixed with stoichiometric acid amounts of terminated dendrimer under esterification conditions or with hydroxyl-terminated dendrimer is subjected to ether forming conditions.

Such reactions are further exemplified by the following working examples. In such working examples, all parts and percentages are by weight unless otherwise indicated.

EXAMPLE 1-

Polyester Dendrimer-Excess Reactant Method

A. Preparation of Polyester Dendrimer

To an ice-cooled, one-liter, 3-neck flask equipped with stirrer, condenser and thermometer and addition funnel, and containing methyl acrylate (33.5 g, 0.389 mole) is added polyethyleneimine

(10.04 g, 0.233 mole) dissolved in 102.2 g of methanol with stirring over a 1- to 1½-hour period. The mixture is allowed to stand at room temperature for 48 hours at which point excess methyl acrylate and methanol are removed by vacuum distillation (15.20 mm Hg at $\leq 28°$ C.) yielding 27.12 g of residue. This residue is analyzed by $^1$H NMR and $^{13}$C NMR and other suitable analytical techniques. This analysis indicates the coreactant adduct to be the Michael's addition product of 1 mole of polyethyleneimine and 1 mole of methyl acrylate at a 90.1 percent yield.

B. Preparation of First Generation Polyamine

To ethylenediamine (152.7 g, 2.54 moles) in a 3-liter reaction flask equipped with stirrer, condenser, addition funnel, thermometer and an ice bath to maintain the temperature at $\sim 3°$ C., is added the aforementioned polyethyleneimine/methyl acrylate adduct of Part A (20.01 g, 0.155 mole) dissolved in 316 g of methanol. The reaction mixture is allowed to stir at room temperature for 24 hours. The resulting mixture (488.71 g) is subjected to vacuum distillation to remove excess ethylenediamine and methanol at 15-20 mm Hg and $\leq 28°$ C. The residue (30.46 g) is analyzed by $^1$H NMR and $^{13}$C NMR and other suitable analytical techniques. The analyses indicate that essentially all of the ester moieties of the amine/methyl acrylate adduct had been converted to amides in the form of a compound represented by the following structural formula:

wherein I is the polyethyleneimine core, thus indicating a yield of >95 percent.

C. Preparation of Polyester Dendrimer

To methyl acrylate (43 g, 2.50 moles) and methanol (79.1 g, 2.47 moles) in a one-liter flask equipped with condenser, stirrer, addition funnel and thermometer, and cooled to 5° C. is added the aforementioned adduct of Part B (17.50 g, 0.111 mole) dissolved in 276.85 g of methanol. The resulting mixture is allowed to stir for 48 hours at room temperature. The reaction mixture (416.45 g) is stripped of methanol and excess methyl acrylate by vacuum distillation (10 mm Hg and ≦28° C.) to produce 42.54 g of residue. Analysis by $^1$H NMR and $^{13}$C NMR indicates the product to be a polyester dendrimer represented by the following formula:

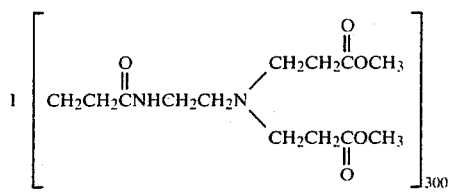

in >95 percent yield.

D. Preparation of Second Generation Polyamine Dendrimer

To ethylenediamine(270 g, 4.49 moles) in the aforementioned flask is added with stirring the polyester dendrimer (20.01 g, 0.061 mole) of Part C dissolved in 396 g of methanol. The resulting mixture is allowed to stir for 48 hours at room temperature at which time excess ethylenediamine and methanol is stripped from the product by vacuum distillation (10 mm Hg at ≦28° C.) to yield 28.88 g (>90 percent yield) of product. This product is determined by $^1$H NMR and $^{13}$C NMR to be the second generation polyamine of the polyester dendrimer of Part C.

E. Preparation of Polyester Dendrimer

To methyl acrylate (28.7 g, 0.33 mole) and methanol (79.1 g, 2.47 moles) is added the aforementioned second generation polyamine dendrimer (13.54 g, 0.035 mole) dissolved in 316.9 g of methanol. The resulting mixture is allowed to stir for 42 hours at 23° C. after which time excess methyl acrylate and methanol are removed by vacuum distillation (10 mm Hg at ≦28° C.) to yield 32.5 g (>90 percent yield) of product residue. Analysis of this residue by $^1$H NMR and $^{13}$C NMR indicate that it is a polyester dendrimer having about 300 core branches with 4 terminal ester moieties per core branch thereby providing about 1,200 terminal ester moieties per dendrimer molecule.

F. Preparation of Third Generation Polyamine Dendrimer

To ethylenediamine (386.8 g, 6.44 moles) is added the aforementioned third generation polyester dendrimer (17.0 g, 0.023 mole) dissolved in 237.3 g of methanol. The addition occurs over a period of 1.75 hours at 6° C. with stirring. The resulting reaction mixture is then allowed to stir for 24 hours at 23° C. after which time excess methanol and ethylenediamine are removed by vacuum distillation (10 mm Hg at ≦28° C.) to yield 24.16 g of residual product. Analysis of this residue indicates a yield of >90 percent of a third generation polyamine dendrimer having about 300 core branches with 4 terminal primary amine moieties per core branch, thereby providing about 1,200 terminal primary amine moieties per molecule of dendrimer.

G. Conversion of Polyester to Salt

Following the procedures of Part E and Part F, a polyester dendrimer is made and then converted to the sodium salt form by the following procedure. A solution of 1.5 g (0.00048 mole) of this polyester dendrimer in 30 ml of methanol is stirred and cooled to 2° C. A solution of 0.31 g of NaOH in 5.3 ml of water is added dropwise to the solution of dendrimer. The reaction mixture is then heated to approximatey 45° C. for approximately 48 hours, after which methanol and water are removed. The resulting off-white solid product is analyzed on a beryllium grid coated with 50 Å of carbon using a JEM-1200EX electronomicroscope using CTEM and STEM techniques. The product is found to comprise molecular rods having diameters of 21–26 Å and cylindrical lengths of approximately 1000–5600 Å representing aspect ratios of approximately 40–250.

Results similar to those reported in Example 1 are achieved when the number of repeat units (n) of polyethyleneimine H$_2$NCH$_2$CH$_2$NH$_n$H is varied from 5 to 1,000.

What is claimed is:

1. A cylindrically-shaped dendrimer having at least 8 core branches emanating from an essentially linear core, each core branch extending through at least two generations and having at least two terminal groups provided that (1) the ratio of terminal groups to the branches emanating from the core is more than one, (2) the density of terminal groups in the dendrimer is at least 1.5 times that of an extended conventional star polymer having a similar linear core and monomeric moieties and a comparable molecular weight and number of core branches wherein each of such branches of the extended conventional star polymer bears only one terminal group, (3) a molecular volume that is no more than 80 percent of the molecular volume of said extended conventional star polymer, and (4) the aspect ratio of the molecules of the dendrimer is at least 2:1.

2. The dendrimer of claim 1 having at least three terminal groups per core branch and (2) a cross-sectional molecular diameter in the range from about 5 to about 1,000 Å and a cylindrical length in the range from about 50 to about 20,000 Å.

3. The dendrimer of claim 1 wherein the linear core has an aspect ratio of 10:1 and the dendrimer has a cross-sectional diameter of 15 to 125 Å and a cylindrical length of 200 to 10,000 Å.

4. The dendrimer of claim 1 wherein the core is derived from a nucleophilic compound.

5. The dendrimer of claim 4 wherein the nucleophilic compound is a linear polyamine.

6. The dendrimer of claim 5 wherein the polyamine is a polyalkylene polyamine.

7. The dendrimer of claim 6 wherein the polyalkylene polyamine is polyethyleneimine having from 5 to 1,000 repeating units.

8. The dendrimer of claim 1 wherein the dendritic branches contain amidoamine linkages.

9. The dendrimer of claim 1 wherein each core branch is a polyamidoamine formed by the Michael Addition reaction of a polyamine and an ester of an ethylenically unsaturated carboxylic acid and then the amidation reaction of the ester with additional polyamine.

10. The dendrimer of claim 9 wherein the polyamine is ethylenediamine and the ester is methyl acrylate.

11. A functionalized dendrimer which is the reaction product of the dendrimer of claim 10 and a reagent capable of reacting with the terminal moieties of said polymer.

12. The dendrimer of claim 10 wherein the core is derived from a linear polyamine and the branches contain amidoamine moieties wherein the terminal groups are primary amine groups.

13. A dendrimer which is a dendrimer represented by the formula:

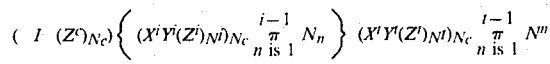

where $i$ is 1 to $t-1$ wherein I is a polyfunctional linear core, $Z^c$ is a functional group bonded to the core and an X group of the first generation, $N_c$ is the number of functional groups bonded to the core, $X^i$ is a monofunctional tail of a repeating unit $Y^i$ of the i generation which is bonded to $Y^i$ and a Z group of the i-1 generation, $Z^i$ is a functional group bonded to $Y^i$ and an X group of the i+1 generation, $N^i$ is a number of at least 2 which corresponds to the multiplicity of the polyfunctional head of $Y^i$, $\pi$ is the product function, $N^{i-1}$ is a number of at least 2 which corresponds to the multiplicity of the polyfunctional head of $Y^{i-1}$ wherein $Y^{i-1}$ is a repeating unit of the $Y^{i-1}$ generation, $X^t$ is the monofunctional tail of a repeating unit $Y^t$ of the terminal generation, $Z^t$ is a terminating group bonded to $Y^t$, $N^t$ is zero or a number which corresponds to the number of $Z^t$ groups bonded to one $Y^t$ group, i represents a number of a particular generation in a series from 1 to a number from 1 to $t-1$, provided that (1) all $X^iY^i(Z^i)_{Ni}$ are the same within a generation and are the same or different in different generations and (2) all $X^tY^t(Z^t)_{Nt}$ of the terminal generation are the same.

* * * * *

UNITED STATES PATENT AND TRADEMARK OFFICE
CERTIFICATE OF CORRECTION

PATENT NO. : 4,694,064

DATED : September 15, 1987

INVENTOR(S) : Doanld A. Tomalia & Pamela M. Kirchoff

It is certified that error appears in the above-identified patent and that said Letters Patent is hereby corrected as shown below:

On the cover page, Sec. 54, the title should read -- ROD-SHAPED DENDRIMERS--.

Column 1, the title should read -- ROD-SHAPED DENDRIMERS--.

Column 6, line 6, "I" should be --(I)--.

Column 6, line 7, "I" should be --(I)--.

Column 6, line 8, "I" should be --(I)--.

Column 6, line 12, "I" should be --(I)--.

Column 6, line 28, "I" should be --(I)--.

Column 6, line 44, insert --wherein t-- between "Nt" and "represents."

Column 6, line 53, the formula should read $$((I)(Z^c)_{Nc}) \left[ (X^i Y^i (Z^i)_{Ni})_{Nc} \; \pi_{n=1}^{i-1} \; N^m \right] (X^t Y^t (Z^t)_{Nt})_{Nc} \; {}^n N^m$$

Column 6, line 55, delete "for where a is one to t-1" and add for where i is t-1--.

UNITED STATES PATENT AND TRADEMARK OFFICE
CERTIFICATE OF CORRECTION

PATENT NO. : 4,694,064
DATED : September 15, 1987
INVENTOR(S) : Donald A. Tomalia & Pamela M. Kirchoff It is certified that error appears in the above-identified patent and that said Letters Patent is hereby corrected as shown below:

Column 7, line 20, the formula should read

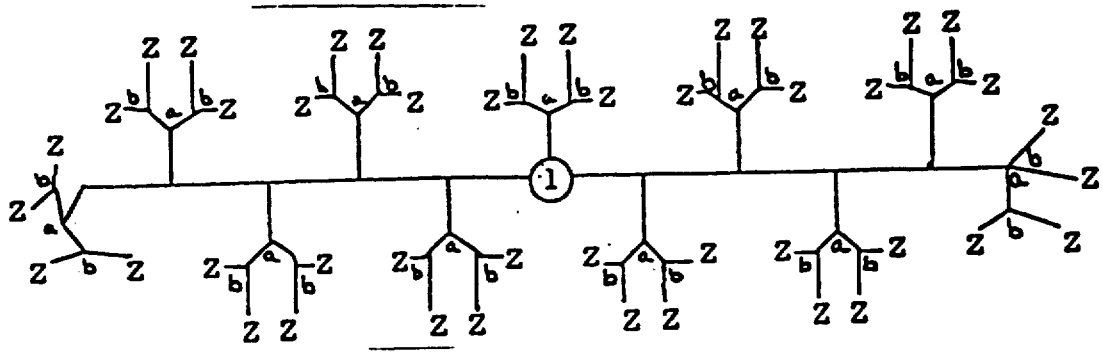

Column 7, Line 28, "I" should be --(I)--.

Column 8, line 60, the formula should read

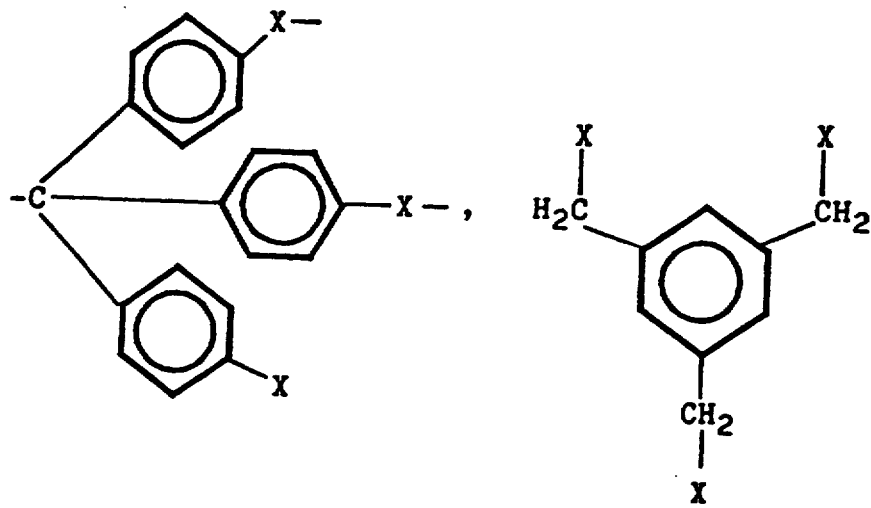

UNITED STATES PATENT AND TRADEMARK OFFICE
CERTIFICATE OF CORRECTION

PATENT NO. : 4,694,064

DATED : September 15, 1987

INVENTOR(S) : Donald A. Tomalia & Pamela M. Kirchoff

It is certified that error appears in the above-identified patent and that said Letters Patent is hereby corrected as shown below:

Column 9, line 31, the formula should read -- (I){$\{ZB-Z-B-(ZR)_2)_2\}_n$ --.

Column 9, line 33, "I" should be --(I)--.

Column 10, line 7, "TU V $_m$" should be -- T(V)(V)$_m$ --.

Column 10, line 9, "V" should be --(V)--.

Column 10, line 10-11, "W[$(X'-T'U V _m]n$" should be -- W[(X' -T')U(V)$_m$]n --.

Column 10, line 14, "V" should be --(V)--.

Column 10, line 16, "T-U- V $_m$" should be -- T-U-(V)$_m$ --.

Column 10, line 18-19, "W[(X'-T'UVmT'-U $_m$]n" should be -- W[(X'-T')UVmT'-U(V)$_m$]n --.

Column 10, line 50, the formula should read $$-CH_2CH_2-\overset{O}{\underset{}{\overset{\|}{C}}}NHCH_2CH_2NH_2$$

UNITED STATES PATENT AND TRADEMARK OFFICE
CERTIFICATE OF CORRECTION

PATENT NO. : 4,694,064

DATED : September 15, 1987

INVENTOR(S) : Donald A. Tomalia & Pamela M. Kirchoff

It is certified that error appears in the above-identified patent and that said Letters Patent is hereby corrected as shown below:

Column 11, line 15, the formula should read

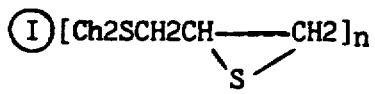

Column 11, line 68, "I (E)$_n$ wherein I" should read --(I)(E)$_n$ wherein(I)--.

Column 12, line 11, the formula should read

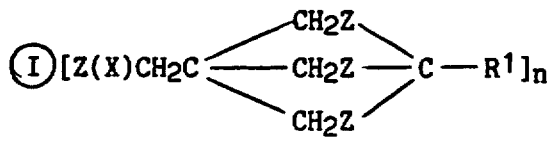

Column 12, line 20, the formula should read

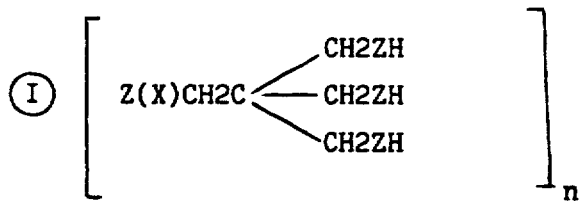

UNITED STATES PATENT AND TRADEMARK OFFICE
CERTIFICATE OF CORRECTION

PATENT NO. : 4,694,064  
DATED : September 15, 1987  
INVENTOR(S) : Donald A. Tomalia & Pamela M. Kirchoff Page 5 of 7

It is certified that error appears in the above-identified patent and that said Letters Patent is hereby corrected as shown below:

Column 12, line 30, the formula should read

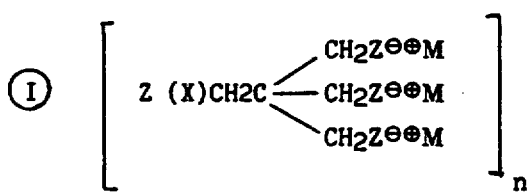

Column 12, line 50, the formula should read

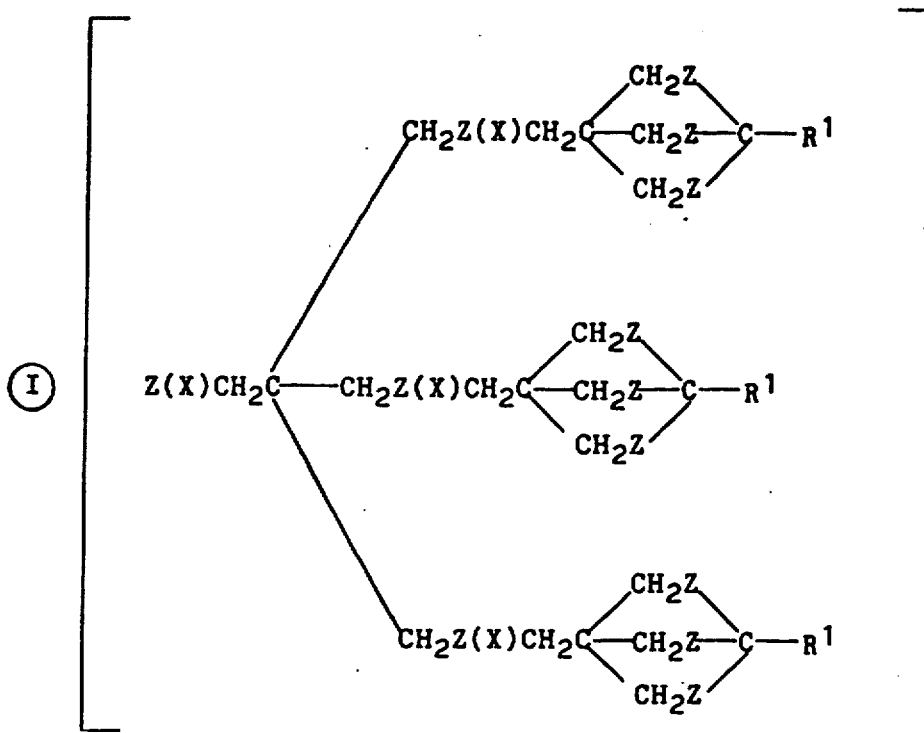

UNITED STATES PATENT AND TRADEMARK OFFICE
CERTIFICATE OF CORRECTION

PATENT NO. : 4,694,064

DATED : September 15, 1987

INVENTOR(S) : Donald A. Tomalia & Pamela M. Kirchoff

It is certified that error appears in the above-identified patent and that said Letters Patent is hereby corrected as shown below:

Column 13, line 11, the formula I $(Z^{\ominus}{\oplus}M)_n$" should be --(I)$(Z^{\ominus}{\oplus}M)_n$ --.

Column 13, line 45-46, the formula should read --(I)$(O-CH_2C[CH_2OH]_3)_n$ --.

Column 16, line 33, the formula "$H_2NCH_2CH_2NH_{300}H$" should read -- $H_2N\{CH_2CH_2NH\}_{300}H$ --.

Column 16, line 67, the formula should read $$(I)(CH_2CH_2\overset{O}{\overset{\|}{C}}NHCH_2CH_2NH_2)_{300}$$

Column 17, Line 1, "I" should be --(I)--.

Column 17, line 22, the formula should read

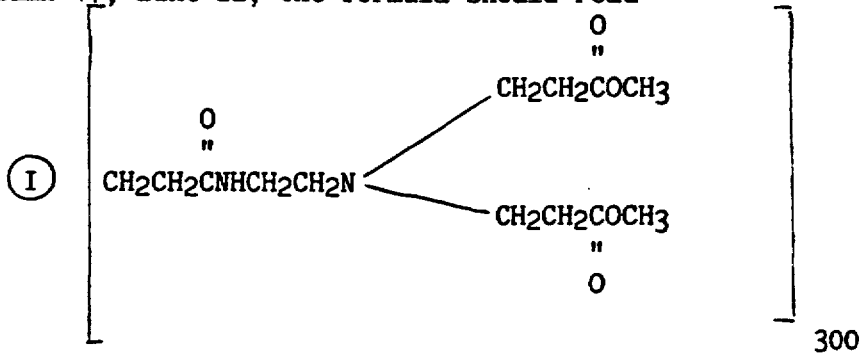

UNITED STATES PATENT AND TRADEMARK OFFICE
CERTIFICATE OF CORRECTION

PATENT NO. : 4,694,064

DATED : September 15, 1987

INVENTOR(S) : Donald A. Tomalia & Pamela M. Kirchoff

It is certified that error appears in the above-identified patent and that said Letters Patent is hereby corrected as shown below:

Column 17, line 66, the word "vaouum" should be -- vacuum --.

Column 18, line 14, the word "approximatey" should be -- approximately --.

Column 18, line 26, the formula "$H_2NCH_2CH_2NH_nH$" should be -- $H_2N\{CH_2CH_2NH\}_nH$ --.

Column 19, line 17, the formula should read $$((I)(Z^c)_{Nc})\left\{(X^iY^i(Z^i)_{Ni})_{Nc} \quad n \quad N^n \atop n \text{ is } 1\right\}^{i-1}(X^tY^t(Z^t)_{Nt})_{Nc} \quad n \quad N^m$$

Column 19, line 21, "I" should be --(I)--.

Signed and Sealed this

Eleventh Day of October, 1994

BRUCE LEHMAN

*Commissioner of Patents and Trademarks*

*Attest:*

*Attesting Officer*